United States Patent [19]

Ogawa et al.

[11] Patent Number: 5,345,403
[45] Date of Patent: Sep. 6, 1994

[54] INFORMATION PROCESSING APPARATUS AND PRINTER USED FOR THE SAME

[75] Inventors: Hiroshi Ogawa, Hitachi; Kouichi Saito, Kitaibaraki, both of Japan

[73] Assignee: Hitachi, Ltd., Tokyo, Japan

[21] Appl. No.: 29,598

[22] Filed: Mar. 11, 1993

[30] Foreign Application Priority Data

Mar. 11, 1992 [JP] Japan ................... 4-052219

[51] Int. Cl.5 .............................................. G06F 1/00
[52] U.S. Cl. ............................................... 364/708.1
[58] Field of Search ........... 364/708.1, 705.01, 705.02, 364/710.13; 235/379

[56] References Cited

U.S. PATENT DOCUMENTS

| | | | |
|---|---|---|---|
| 4,232,367 | 11/1980 | Youden et al. | 364/710.13 |
| 4,751,664 | 6/1988 | Holm | 364/705.02 |
| 4,839,837 | 6/1989 | Chang | 364/708.1 |
| 4,883,376 | 11/1989 | Iwase et al. | 364/708.1 |
| 5,115,374 | 5/1992 | Hongoh | 364/708.1 |
| 5,221,838 | 6/1993 | Gutman et al. | 235/379 |

FOREIGN PATENT DOCUMENTS 2-175273 7/1990 Japan .

Primary Examiner—Long T. Nguyen
Attorney, Agent, or Firm—Antonelli, Terry, Stout & Kraus

[57] ABSTRACT

The inventive information processing apparatus consists of a processor-keyboard base section and a separate printer which is detachably attached to the base section with the intention of reducing the thickness and weight and significantly enhancing the compactness and portability of the apparatus. The information processing apparatus comprises a base case, a processor accommodated in the base case for processing text and graphic data, a liquid crystal display panel fitted pivotally in a shut/open fashion in the rear of the base case, a display screen included in the liquid crystal display panel for displaying characters and figures based on data provided by the processor, and a printer for printing characters and figures based on data provided by the processor and displayed on the display panel. The printer is detachably attached to the back of the liquid crystal display panel, with a circuit for communicating print data between the processor and the printer when the printer is attached, and a slot is formed at a lower section of the liquid crystal display panel so as to allow a sheet of print paper to be fed to the printer.

3 Claims, 13 Drawing Sheets

PAPER SETTING FORM

INFORMATION PROCESSING APPARATUS AND PRINTER USED FOR THE SAME

BACKGROUND OF THE INVENTION

This invention relates to an information processing apparatus such as a personal computer or a word processor. More particularly, the invention relates to an information processing apparatus which consists of an information processor, with a display panel fitting pivotally in a shut/open fashion on the processor base section, and a separate printer which is connected to the processor at the time of printing.

Currently, a growing number of information processing apparatuses are being introduced to offices for the enhancement of business efficiency. Consequently, a large proportion of desk space is occupied by these information processing apparatuses which incorporate bulky CRT display units conventionally. From this viewpoint, there have been proposed information processing apparatuses using compact liquid crystal display panels.

There are known information processing apparatuses having liquid crystal display panels, with printers being accommodated within the main body of processor, as shown in FIG. 20 and FIG. 21. The arrangement of these apparatuses shown in FIGS. 20 and 21 will be explained in brief.

In FIGS. 20 and 21, reference numeral 1 denotes a base case, 2 is an external memory such as a floppy disk memory, 4 is an input device such as a keyboard built in the base case, and 5 is a display panel having a liquid crystal display screen 51 fitted pivotally in a shut/open fashion on the base case 1. 6 indicates a printer accommodated in the rear section of the base case, 7 is an upper case of the liquid crystal display panel, 19 is a hook provided on the upper case 7 so that the upper case is latched to the base case when it is shut, 21 is a paper guide fitted on the base case 1 or the back of the liquid crystal display panel, 9 is a sheet of print paper, and 40 is a knob used for the manual paper feed.

The liquid crystal display panel 5 is swung out from the base case 1 when the apparatus is operated, and it is shut when the apparatus is not being used. For the printing operation, the liquid crystal display panel 5 is kept open in many cases so that the operator may enter print commands by viewing the display screen. In this case, the liquid crystal display panel 5 prevents the operator from viewing the set position of the print paper 9. Accordingly, the operator is obliged to set the print paper by feel, without seeing the paper, and therefore it is difficult to set the paper to the correct position unless the operator stands up to peer over the display panel 5 or shuts the display panel temporarily for this operation.

Therefore, these conventional information processing apparatuses are deficient in the operationability of printing and are also too bulky and heavy to carry due to the printer built in the base case.

As an example of improving the printing operability mentioned above, there is an image processing apparatus described in Japanese patent publication JP-A-2-175273. This apparatus is designed to move the printer, which is fitted pivotally in the rear of the keyboard, close to the back of the display panel based on a gear link mechanism in response to the swing movement of the display panel from the keyboard base section so that a recording sheet can be set to the printer through the opening located at the bottom of the display panel.

However, this image processing apparatus is deficient in that it is not portable due to the presence of the printer fixed in the rear of the keyboard base section, although it is pivotal.

Both of the foregoing prior art apparatuses are information processing apparatuses equipped with built-in printers at the expense of portability. According to the survey of the inventors of the present invention, conventional small information processing apparatus with built-in printers weigh 4 to 7 kg and use print paper of B4 size at the most. Assuming that the information processing apparatus together with document files are hand-carried in a business case, it is desirable for the apparatus to be 3 cm or less in thickness and 2 kg or less in weight and capable of printing a sheet of print paper of at least A4 size.

However, the foregoing prior art apparatuses have their printers fixed to the base section inseparably, and therefore the above-mentioned requirement for portability cannot be attained at all.

In view of this situation, the inventors of the present invention have intended to fulfill the above-mentioned requirement of portable information processing apparatus by separating the printer, which is generally thicker than the base section and is significantly heavy, from the base section, and to design an apparatus for which the associated printer can easily be detachably attached to the base section. It is not always necessary to carry the printer together with the processor base section, but it is more convenient at times to leave the printer at home or in the office and use it together when necessary.

SUMMARY OF THE INVENTION

An object of this invention is to provide an information processing apparatus with reduced thickness and weight and enhanced compactness and portability through the adoption of the separate structure of a processor-keyboard base section and a printer which can be detachably attached to the base section.

In order to achieve the above objective, the information processing apparatus comprises a base case, a processor accommodated in the base case and operating to process text and graphic data, a liquid crystal display panel fitted pivotally in a shut/open fashion in the rear of the base case, a display screen included in the liquid crystal display panel and operating to display characters and figures based on data provided by the processor, and a printer which prints characters and figures based on data provided by the processor and displayed on the display panel, wherein the printer is detachably attached to the back of the liquid crystal display panel, with a circuit for the communication of print data between the processor and the printer being established when the printer is attached, and a slot is formed at a lower section of the liquid crystal display panel so as to allow a sheet of print paper to be fed in to the printer.

DESCRIPTION OF THE PREFERRED EMBODIMENTS

Figure 1:
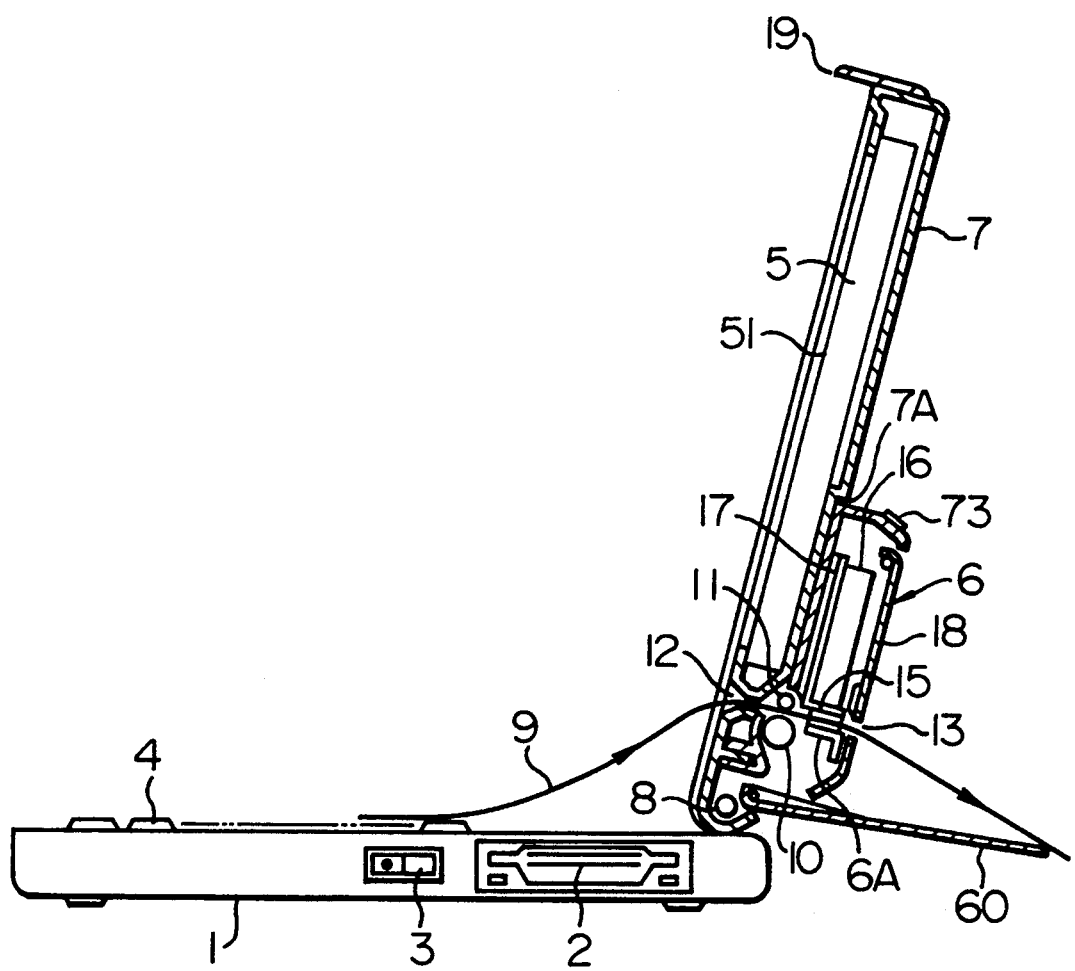
FIG. 1 is a side cross-sectional diagram showing the principal portions of the information processing apparatus based on an embodiment of this invention.

The information processing apparatus based on an embodiment of this invention will be explained with reference to the drawings.

In FIG. 1 through FIG. 4, reference numeral 1 denotes a base case of the information processing apparatus. The base case 1 accommodates an auxiliary memory 2 such as a floppy disk memory, a power supply circuit, and a printed circuit board (not shown) on which a CPU (central processing unit), memories, a CG (character generator), etc. are mounted. Indicated by 3 is a power switch located on the side wall of the base case. 4 is an input device such as a keyboard arranged at the top of the base case and used by the operator to enter control commands and data, and 5 is a liquid crystal display panel which displays information based on commands and data entered on the keyboard 4.

Figure 2:
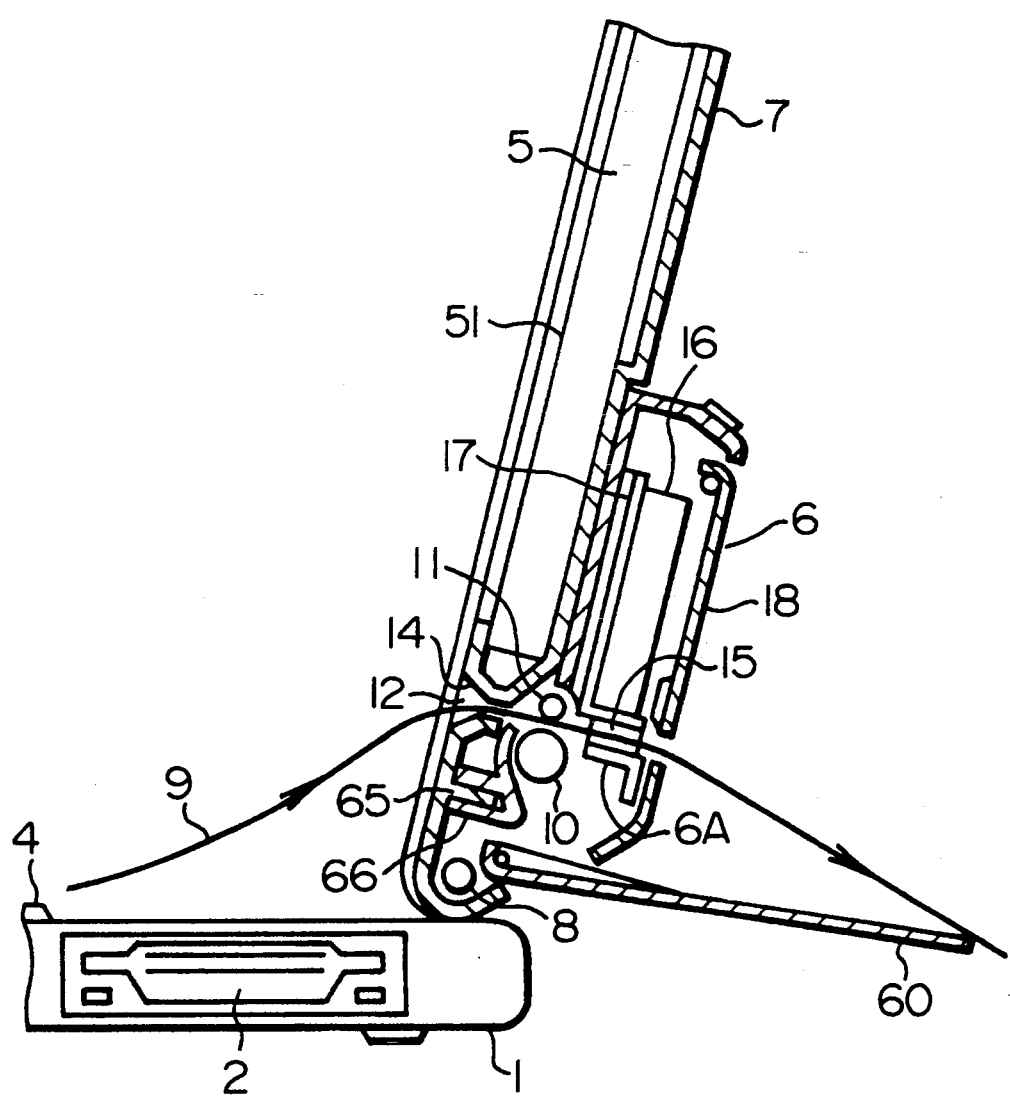
FIG. 2 is a cross-sectional diagram showing by enlargement the principal portions of the apparatus.
Figure 3:
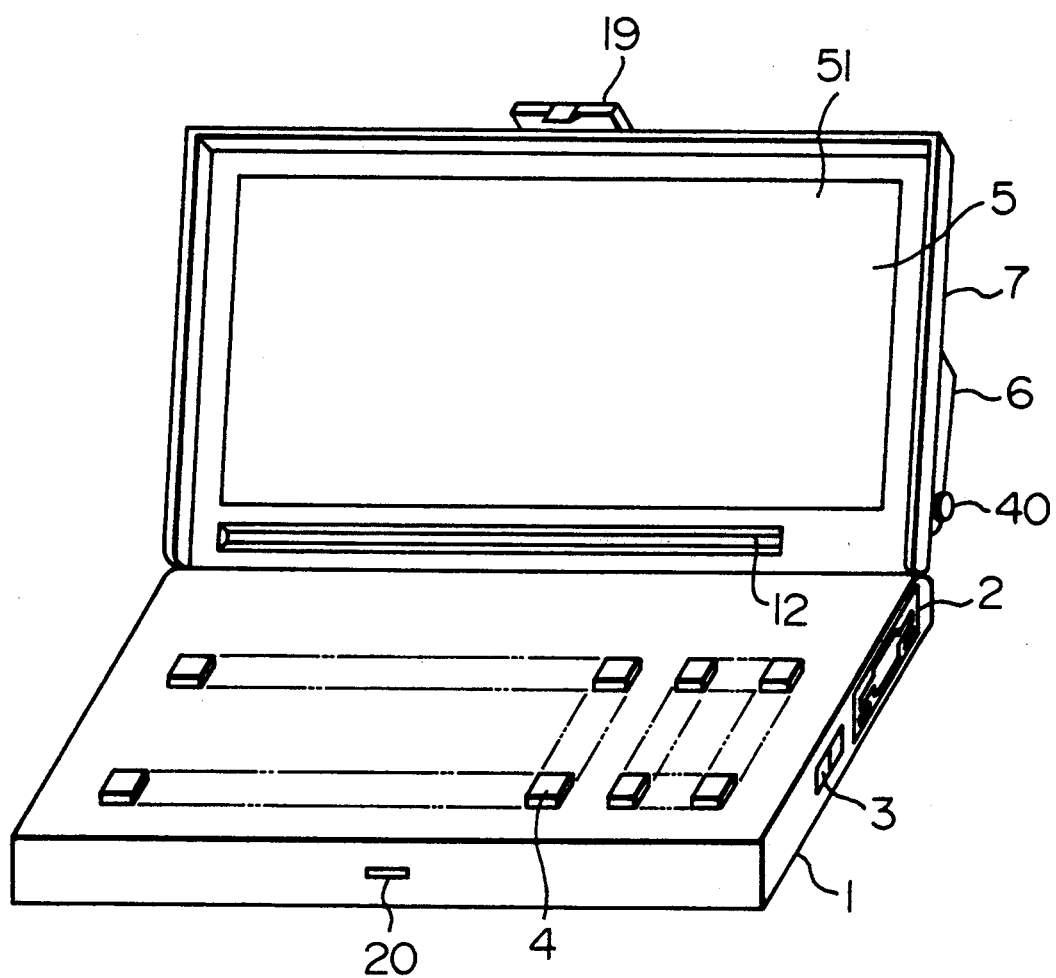
FIG. 3 is a perspective diagram showing the external view of the apparatus.
Figure 10:
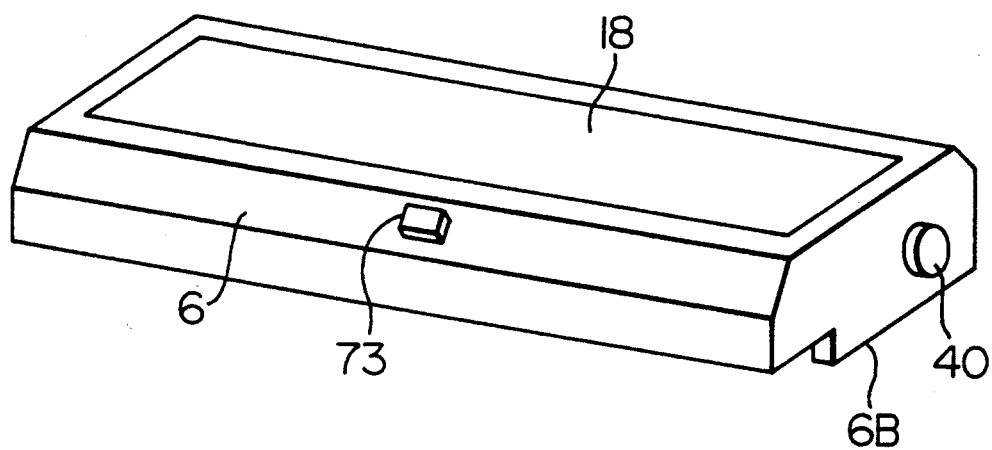
FIG. 10 is a perspective diagram showing the external view of the printer.
Figure 11:
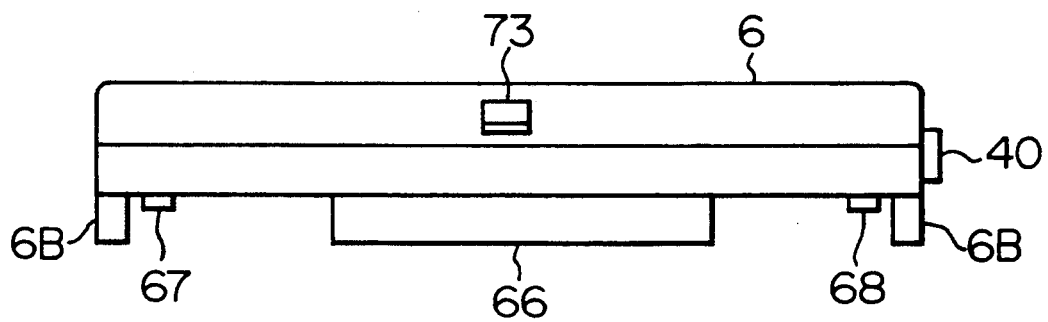
FIG. 11 is a diagram showing the front view of the printer.

The display panel 5 has its upper case 7 provided with a pivotal case cover 60, and a printer 6 can be attached to the display panel by opening the case cover 60. In FIG. 2, in attaching the printer 6, the case cover 60 is opened, and a groove 66 formed at the bottom of the printer is coupled to a protrusion 65 which is formed on the upper case 7, while at the same time the upper end of the printer is engaged with a support 7A provided on the upper case so that it is clamped stably. The printer can be attached more stably through the formation of skirts 6B at both sides of a plastic case of the printer as shown in FIGS. 10 and 11 so that the printer is held resiliently by the display panel. The printer is detached from the display panel by following the above-mentioned procedure in reverse. 6A indicates a printing mechanism of the printer.

The display panel 5 has a liquid crystal screen 51, and further incorporates an inverter and associated components (not shown) for driving the liquid crystal element of the screen. The liquid crystal screen 51 is preferably a flat screen so that the apparatus is thin. The display panel may be of another material instead of the liquid crystal element.

The upper case is supported by a pivot 8 so that it is opened or shut based on a clam-shell like structure against the base case 1.

For the printing operation, a sheet of print paper 9 is inserted between a feed roller 10 and a pinch roller 11, and the feed roller 10 is driven to rotate. Then, the print paper is fed in through a slot 12 formed in the display panel 5, transported to a print head 15, and evacuated through a slot 13 at the back of the display panel. The slot 12 has a tapered cross-section as shown by 14 so that the print paper is guided smoothly.

The printer 6 mainly consists of a print head 15, an ink ribbon cartridge 16, a carriage 17 for moving the ink ribbon cartridge right and left, a belt (not shown) for driving the carriage 19 and winding the ink ribbon, a carriage motor (not shown) for driving the belt, an LF motor (not shown) for driving the feed roller 10, and a platten knob 40 used to rotate the feed roller 10 manually.

Figure 4:
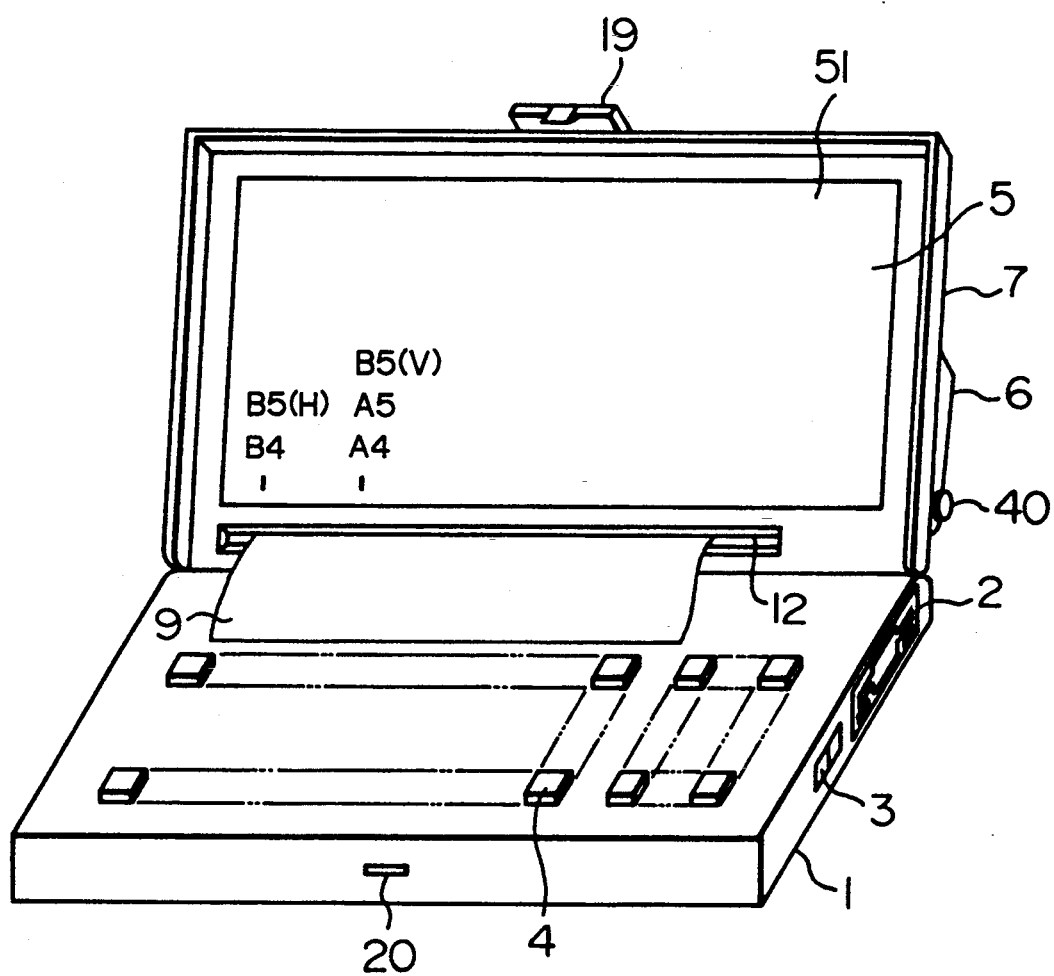
FIG. 4 is a diagram showing the apparatus in the printing operation and an example of the displayed paper setting marks.

The ink ribbon cartridge 16 can be accessed for replacement by opening a cover 18 which is fitted pivotally on the printer 6. A label of paper setting for several kinds of paper sizes is displayed on the screen of the display panel 5 as shown in FIG. 4.

A sheet of print paper 9, with its leading edge being inserted to the slot 12, lies on the upper surface of the keyboard 4 so that it is fed in stably. The upper case 7 has a lock piece 19, which engages with a latch hall 20 formed in the base case 1 when it is shut.

Figure 5:
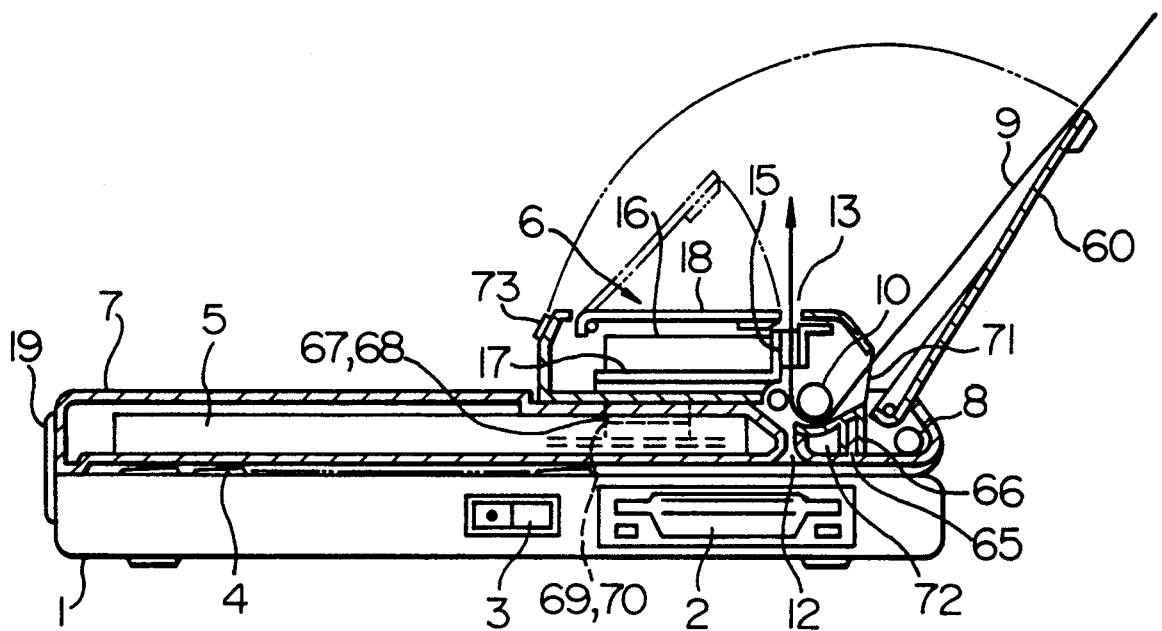
FIG. 5 is a side cross-sectional diagram showing the principal portions of the apparatus in the printing operation.

FIG. 5 shows how to use the apparatus, with its upper case 7 being shut. The printer 6 is attached to the display panel in the same procedure as explained above. First, the case cover 60 provided on the top of the upper case 7 is opened, and the groove 66 formed in the bottom of the printer 6 is set to the protrusion 65 which functions to position and hold the printer. At the same time, a connector 67 for supplying power to the cartridge motor and Lf motor and another connector 68 for sending the motor drive signals and print control signals to the printer are engaged with connectors 69 and 70 on the upper case 7. These connectors having their contacts made of relatively hard metallic plates also serve to reinforce the support of the printer on the upper case.

This cordless connection of the printer to the upper case is advantageous from the viewpoints of operability, electromagnetic radiation and manufacturing cost. The electric circuit established by these connectors for the communication of print commands and data between the processor and printer may be replaced with an optical coupler or acoustic coupler with the equivalent communication function.

A sheet of print paper 9 is inserted through the slot 71 of the printer, fed through the gap between the feed roller 10 and guide 72, fed by the feed roller 10 and pinch roller 11, and evacuated through the slot 13 after it is printed by the print head 15. The printing operation is controlled by the operator by use of a switch 73 provided on the printer. The print paper 9 goes through the printer in the direction shown by the arrow.

Figure 6:
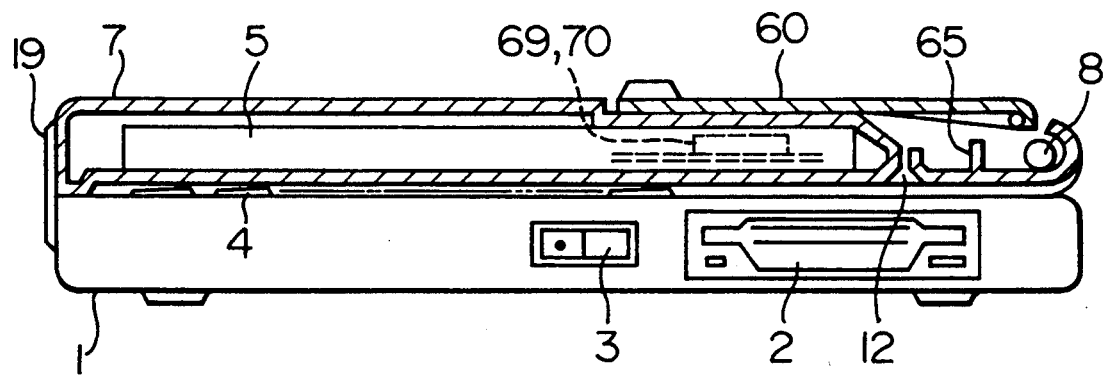
FIG. 6 is a side cross-sectional diagram showing the principal portions of the apparatus, with the printer being removed.
Figure 7:
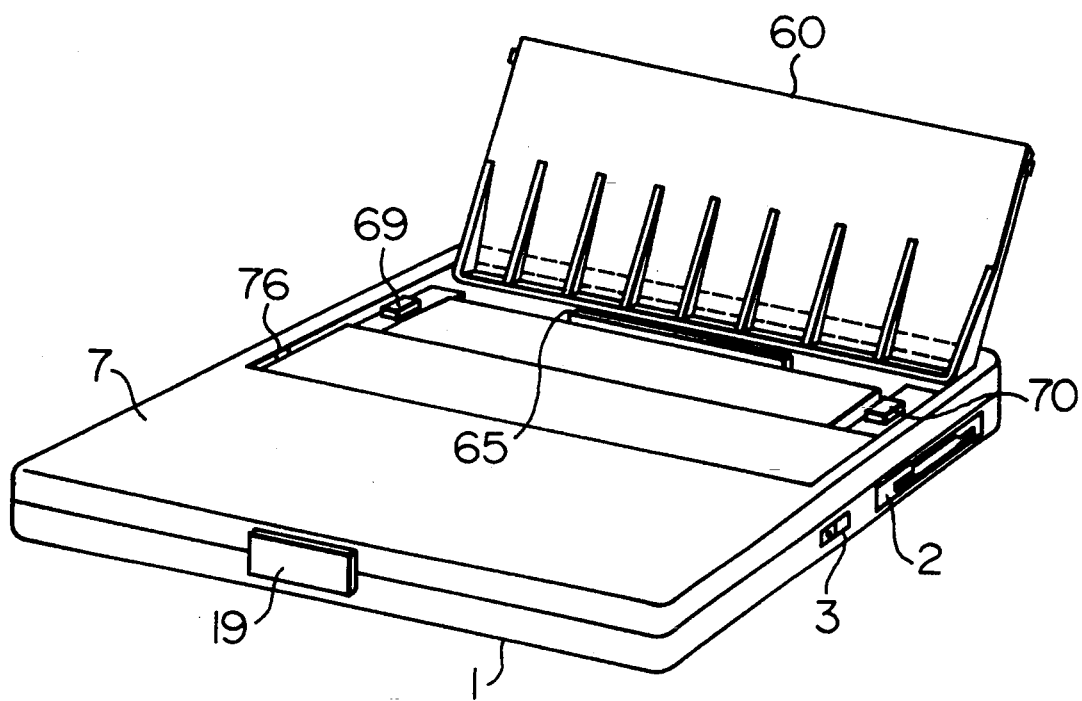
FIG. 7 is a perspective view of the apparatus, with the case cover being opened.

FIG. 6 shows the apparatus, with the printer 6 being removed and the upper case 7 being in its closed state, and FIG. 7 shows the apparatus, with the printer 6 being removed and the case cover 60 being in its open state.

Figure 8:
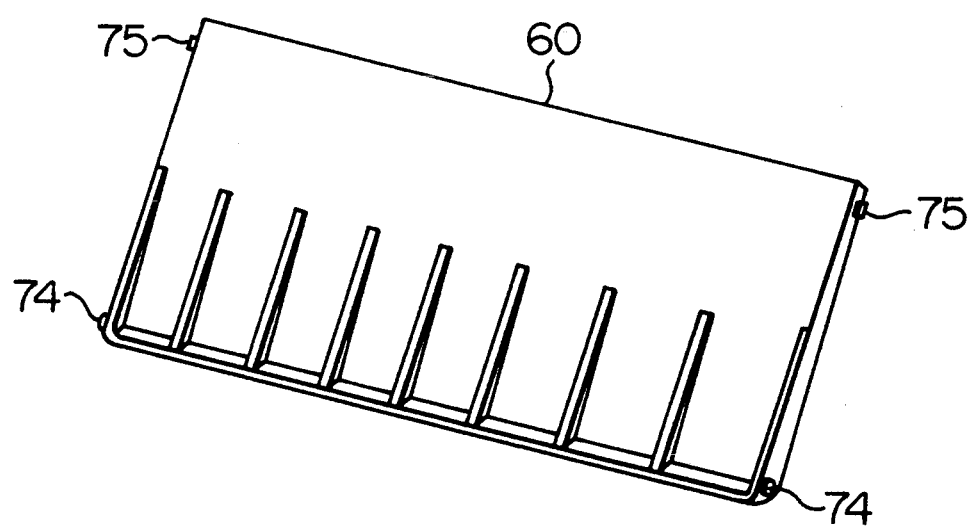
FIG. 8 is a perspective diagram of the case cover of the apparatus.

The case cover 60 is designed to be detachable as shown in FIG. 8, and it is attached to the upper case by coupling the bosses 74 to the recesses (not shown) formed in the upper case while warping the case cover. When the case cover 60 is shut, bosses 75 are engaged with recesses 76 formed in the upper case 7 and it is kept closed by its own resiliency. The case cover 60 also functions to support the print paper.

Figure 9:
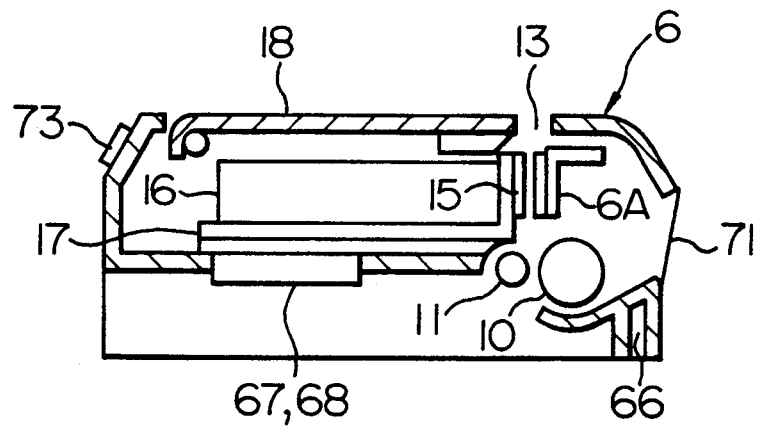
FIG. 9 is a side cross-sectional diagram of the printer based on tis invention.
Figure 12:
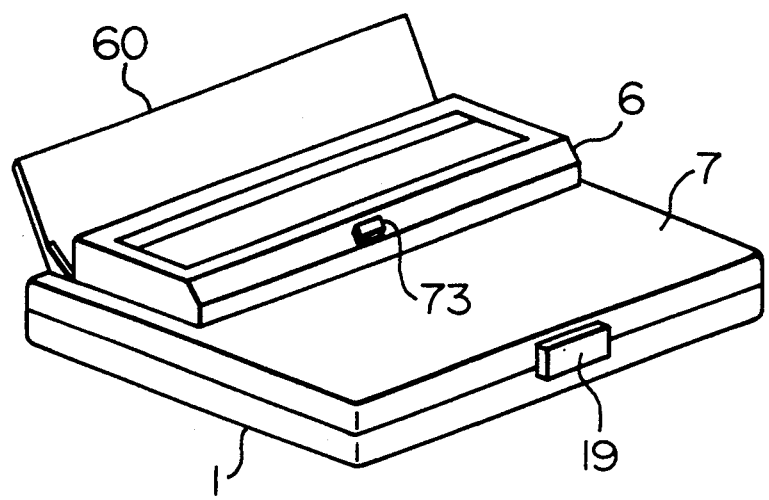
FIG. 12 is a perspective diagram showing the external view of the apparatus, with the printer being attached.
Figure 13:
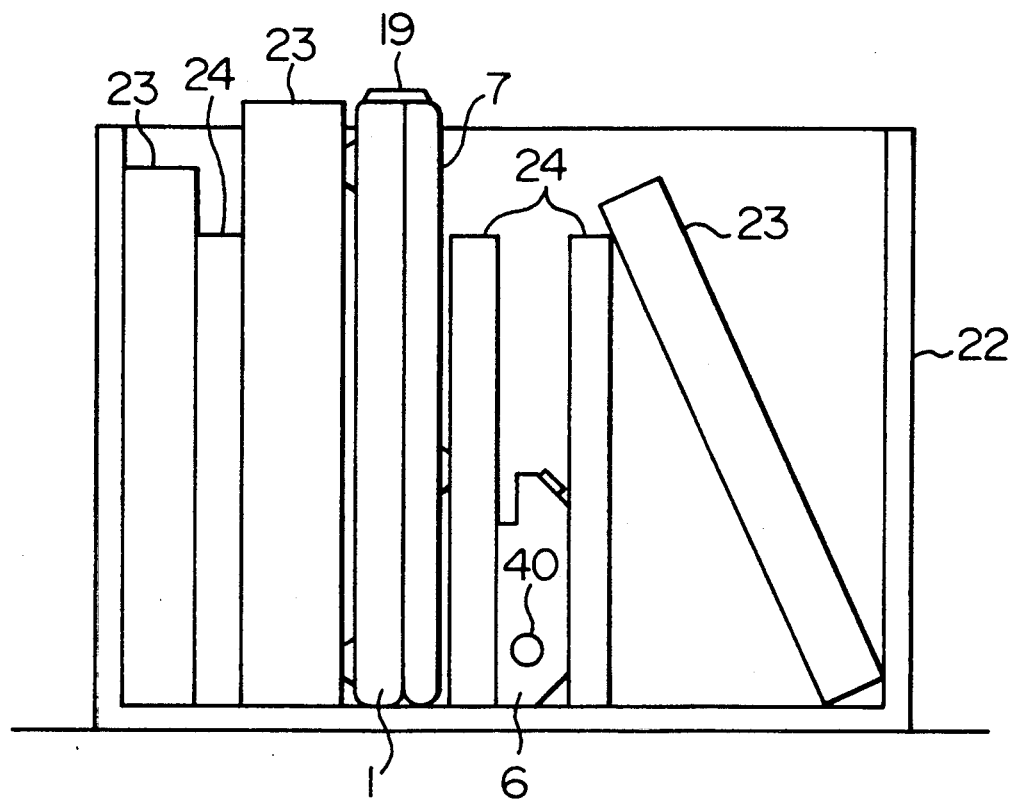
FIG. 13 is a diagram showing the apparatus in its stored state.

FIGS. 9, 10 and 11 show the structure of the printer 6, FIG. 12 shows the apparatus, with the printer 6 being attached to the upper case 7, and FIG. 13 shows the apparatus in its stored state. The inventive apparatus is compact enough to be placed on a book shelf 22 together with a book 23 and document file 24.

Next, the operation of the display panel 5 explained on FIG. 4 for displaying the paper setting positions on the display screen will be explained with reference to FIGS. 14, 15 and 16.

Figures 14, 15:
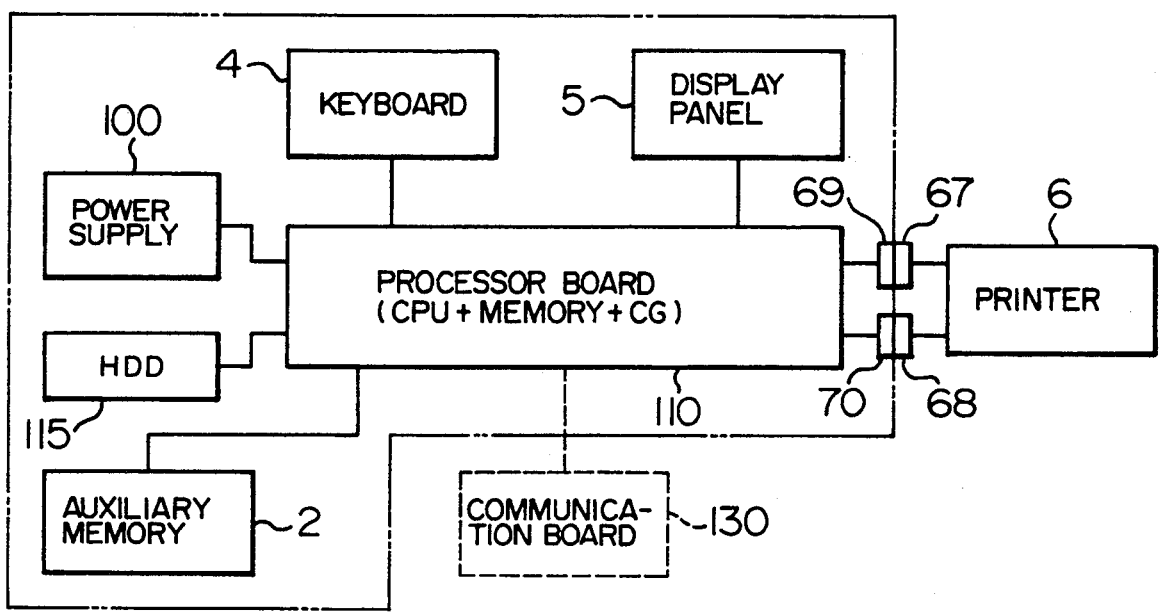
FIG. 14 is a block diagram showing the internal arrangement of the apparatus.
FIG. 15 is a diagram used to explain a displayed label for setting print paper.

FIG. 14 shows the internal arrangement of the inventive information processing apparatus. The base case 1 accommodates an auxiliary memory 2 such as a floppy disk memory or IC card memory, a hard disk memory 115 having a large storage capacity, a power supply circuit 100, and a printed circuit board 110 which constitutes a processor including a CPU (central processing unit), memories, a CG (character generator), etc. The processor board 110 is connected with the keyboard 4 and display panel 5. Furthermore, the inventive printer 6 is connected to the processor board in a detachable manner as mentioned previously. The processor board is designed to allow the connection of various optional devices which include a communication board 130 for implementing the data communication with external personal computers for example.

FIG. 15 shows the entry field displayed on the display panel 5 for specifying the setting of print paper which is printed by the printer 6. The operator enters the paper size and layout direction of the print paper 9 on the keyboard 4, and the entered items are displayed in the areas 250 and 251.

Figure 16:
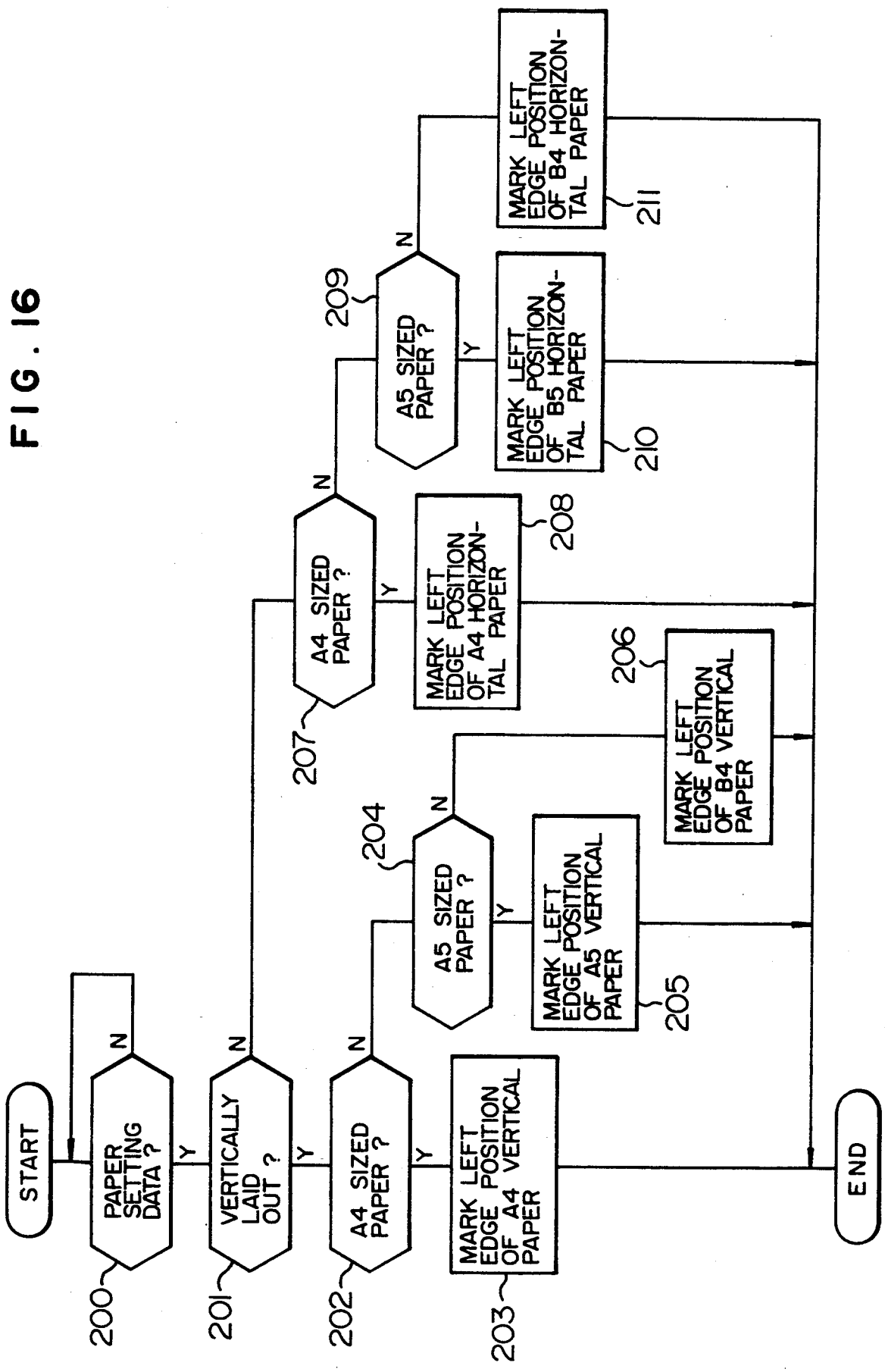
FIG. 16 is a flowchart used to explain the display operation for the leftmost section of the display screen.

FIG. 16 explains, by a flowchart, the operation of the processor for displaying the leftmost section of the print paper 9 on the screen of the display panel 5. When the operator presses the "format set" key on the keyboard 4, the entry field shown in FIG. 15 is displayed on the screen 51 of the display panel 5. Then, the operator enters the paper size and layout direction.

The processor tests in step 200 whether or not the input data is format setting data. In case the input data is not format setting data, the sequence returns to test the input data. If the input data is format setting data, the processor tests whether or not the paper layout direction is vertical (step 201).

In case the paper layout direction is vertical, the processor tests whether or not the paper size is A4 (step 202). If the paper size is A4, the processor displays the left edge of a vertically laid-out A4 sized paper on the preset location of the display screen (step 203).

If the paper size is not A4, the processor tests whether or not the paper size is A5 (step 204). If the paper size is A5, the processor displays the left edge of a vertically laid-out A5 sized paper on the preset location of the display screen (step 205). If the paper size is not A5, the processor displays the left edge of a vertically laid-out B4 sized paper on the preset location of the display screen (step 206).

In case the paper layout direction is not vertical, the processor tests whether or not the paper size is A4 (step 207). If the paper size is A4, the processor displays the left edge of a horizontally laid-out A4 sized paper on the preset location of the display screen (step 208). If the paper size is not A4, the processor tests whether or not the paper size is A5 (step 209).

If the paper size is A5, the processor displays the left edge of a horizontally laid-out A5 sized paper on the preset location of the display screen (step 210). If the paper size is not A5, the processor displays the left edge of a horizontally laid-out B4 sized paper on the preset location of the display screen (step 211).

Although the foregoing operation displays only the left edge of the print paper 9, the right edge of the paper may also be displayed at the same time. By extending the displayed lines which indicate the left and right edges of print paper, it becomes easy to set the print paper 9 more accurately.

Although the conventional information processing apparatus occupies little space when stored by being on its side, it is unstable and prone to fall down. According to this invention, the base case 1 which incorporates the keyboard 4 is combined with the display panel 5 in a clam-shell like structure, and the printer 6 is detachably attached to the upper case, with a sheet of print paper being fed in through the display panel, whereby the apparatus occupies little desk space in both the operating state and stored state.

Print paper can be fed in to the printer at the front of the apparatus, and the operability of printing is improved significantly. The paper setting position is displayed on the screen of the display panel 5, and the print paper can be set accurately.

Figure 17:
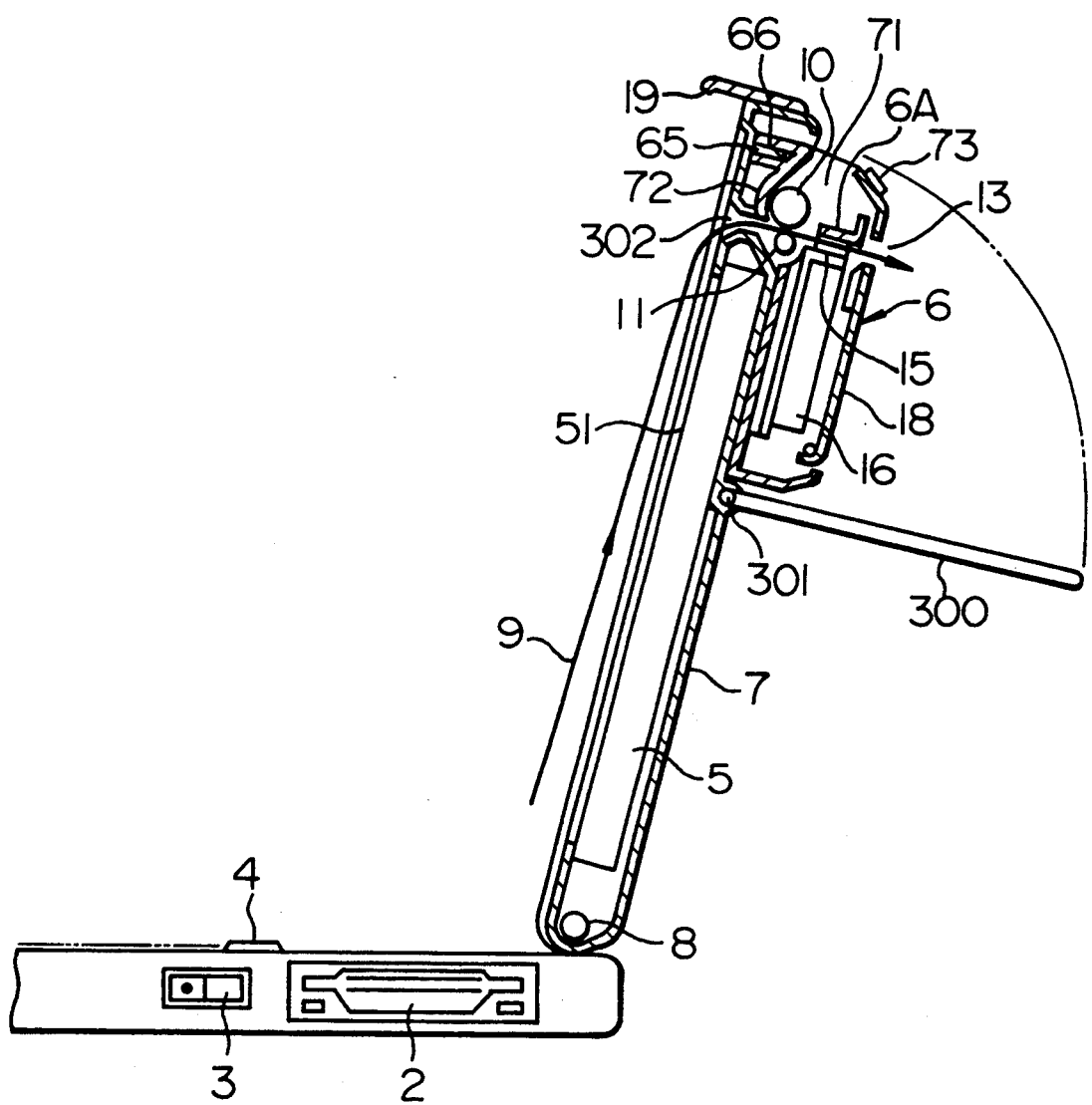
FIG. 17 is a cross-sectional diagram showing the principal portions of the information processing apparatus based on another embodiment of this invention.

Various embodiments of this invention will be explained with reference to FIGS. 17 and 18. In FIG. 17, the upper case 7 has a case cover 300, which is pivotal in a shut/open fashion and detachably attached on it through the engagement of a shaft 301 with a hole (not shown) formed in the upper case 7. With the case cover 300 being open, the printer 6 is attached to the upper case in the same manner as the previous embodiment.

A slot 302 is formed at the upper section of the display panel 5, and the print paper 9 is fed in through the slot, transported by the feed roller 10 and pinch roller 11 to the print head 15, and evacuated through the slot 13.

When the apparatus is operated for printing, with the upper case 7 being shut to the base case 1, the print paper 9 is inserted through a slot 71 of the printer 6 into the gap between the feed roller 10 and guide 72, transported to the print head 15, and evacuated through the slot 13.

Figure 18:
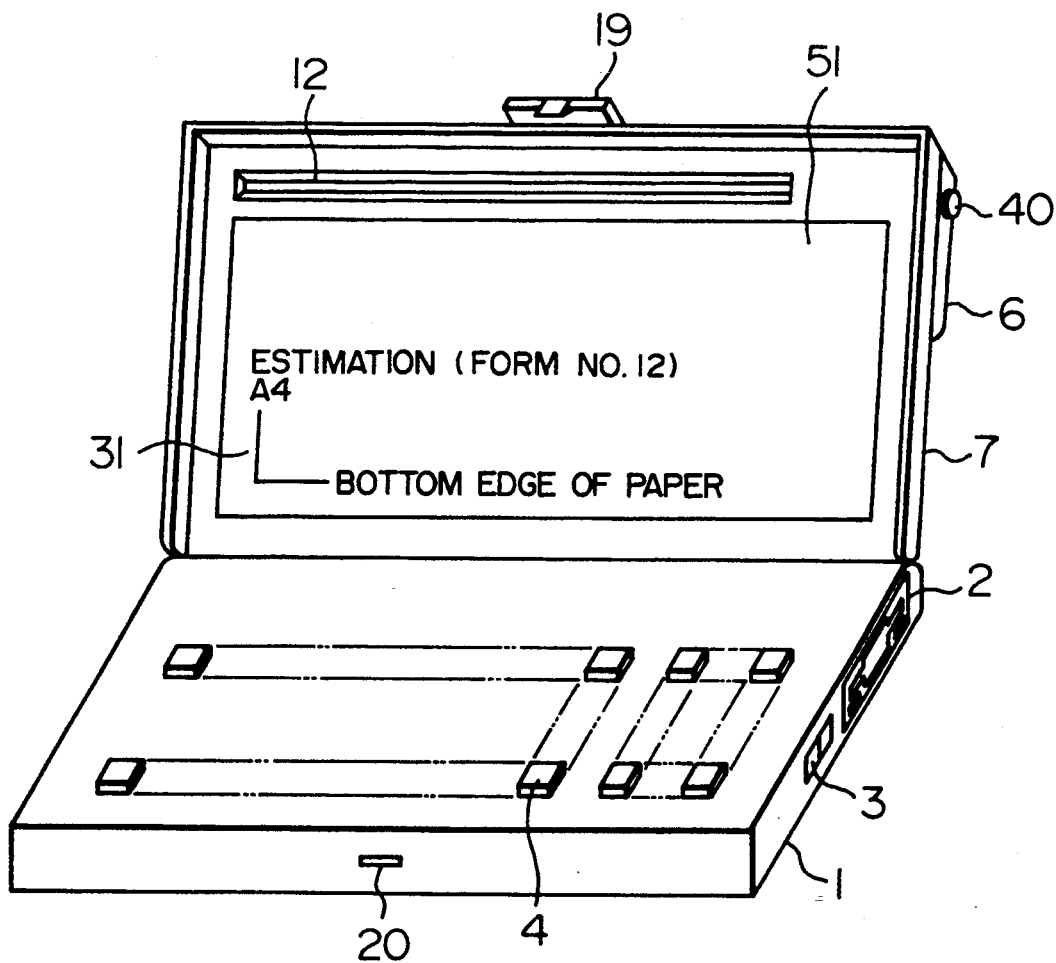
FIG. 18 is a perspective diagram showing the external view of this apparatus.

The embodiment shown in FIGS. 17 and 18 features that the printer 6 is attached to the upper case 7 at its remote section from the hinge 8 and the paper insertion slot 302 is located at the top of the display panel 5. This structure facilitates the wiring between the processor board and the upper case.

In printing a form (formatted paper), it can be set accurately by placing its bottom left corner coincident with the displayed mark 31 shown in FIG. 18, and the form can be printed at exact positions. A similar coner mark may be displayed on the screen in the preceding embodiment shown in FIG. 14 with the intention of enhancing accuracy of the print position, and the improvement print quality.

Another advantage of this embodiment is that the print paper 9 is supported stably by the surface of the display panel 5 when it is fed in through the slot 302 to the printer 6.

Figure 19:
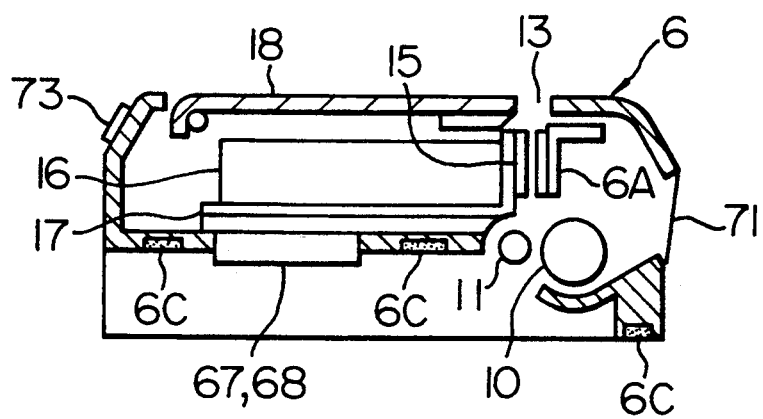
FIG. 19 is a cross-sectional diagram showing the principal portions of the printer based on this embodiment.
Figure 20:
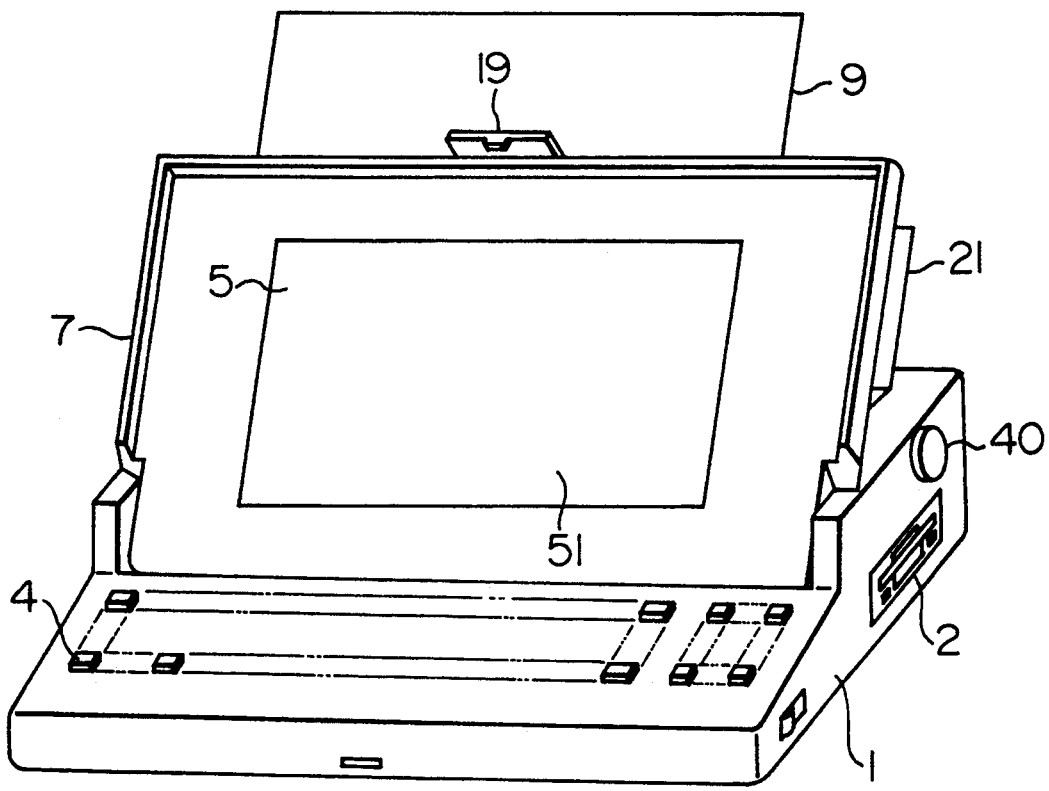
FIG. 20 is a perspective view of the conventional information processing apparatus in the printing operation.
Figure 21:
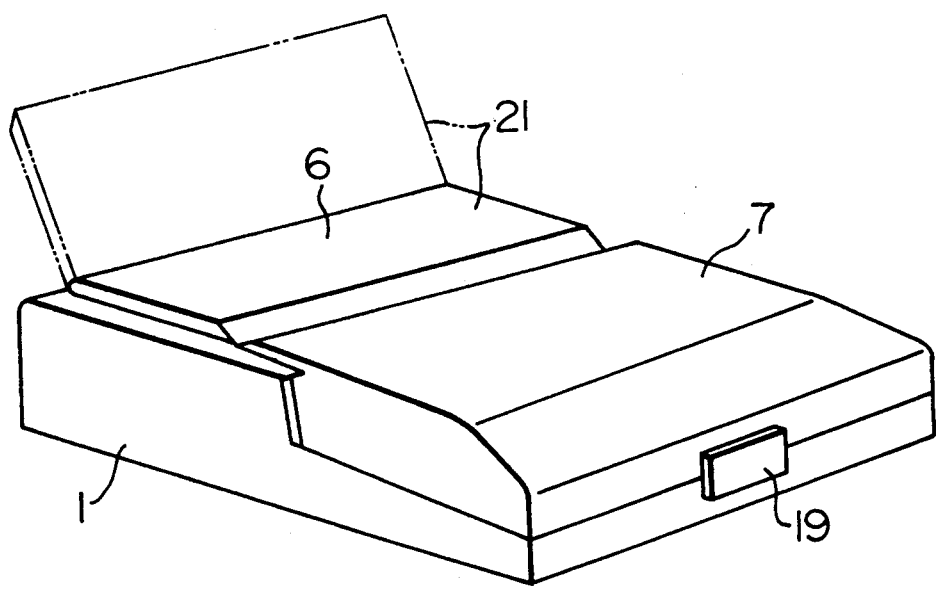
FIG. 21 is a perspective diagram showing the conventional apparatus in its stored state.

FIG. 19 shows another embodiment of the structure for attaching the printer detachably to the display panel. This attachment structure is based on a permanent magnet 6C embedded in the plastic case of the printer. Another permanent magnet or a magnetic metal (not shown) is fixed on the display panel at the position corresponding to the permanent magnet 6C, and the printer is attached to the display panel by the magnetic attracting force produced by these magnetic members. The structure is designed to establish a circuit for the communication of print commands and print data as mentioned previously when the printer is attached to the display panel.

According to this invention, as described above, the information processing apparatus comprises a base case, a processor accommodated in the base case and operating to process text and graphic data, a liquid crystal display panel fitted pivotally in a shut/open fashion in the rear of the base case, a display screen included in the liquid crystal display panel and operating to display characters and figures based on data provided by the processor, and a printer which prints characters and figures based on data provided by the processor and displayed on the display panel, wherein the printer is attached detachably to the back of the liquid crystal display panel, with a circuit for the communication of print data between the processor and the printer being established when the printer is attached, and a slot is formed at a lower section of the liquid crystal display panel so as to allow a sheet of print paper to be fed into the printer. Consequently, the base section of the information processing apparatus has a drastically reduced, relative to conventional apparatuses, thickness and weight and significant improvement of compactness and portability. Print paper is fed through the slot formed in the display panel, whereby the printing operation is simplified and sped up.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An information processing apparatus comprising:
a base case;
a processor, accommodated in said base case, for processing text and graphic data;
a liquid crystal display panel fitted pivotally in a shut/open fashion in a rear portion of said base case;
a display screen, included in said liquid crystal display panel, for displaying characters and figures based on data provided by said processor; and
a printer for printing characters and figures based on data provided by said processor and displayed on said display panel, said printer being detachably attached to a back portion of said liquid crystal display panel, with a circuit for communicating print data between said processor and said printer when said printer is attached, and an opening being formed in said liquid crystal display panel so as to allow a sheet of print paper to be fed into said printer.

2. An information processing apparatus according to claim 1, wherein said display screen of said liquid crystal display panel displays a mark of a setting position of a side edge and bottom edge of a sheet of print paper in accordance with a paper size selected by a print command so that the print paper can be set accurately with respect to a print head of said printer.

3. An information processing apparatus according to claim 1, further comprising printer attachment means which includes a magnet and a magnetic member, said printer being attached to said liquid crystal display panel by utilization of a magnetic attracting force produced by said magnet and magnetic member in combination.

* * * * *